United States Patent
Ding et al.

(10) Patent No.: US 12,403,895 B2
(45) Date of Patent: *Sep. 2, 2025

(54) METHOD AND DEVICE FOR VEHICLE PARKING CONTROL

(71) Applicant: Beijing Tusen Weilai Technology Co., Ltd., Beijing (CN)

(72) Inventors: Feng Ding, Beijing (CN); Chufan Kong, Beijing (CN); Nan Wu, Beijing (CN)

(73) Assignee: Beijing Tusen Weilai Technology Co., Ltd., Beijing (CN)

( * ) Notice: Subject to any disclaimer, the term of this patent is extended or adjusted under 35 U.S.C. 154(b) by 133 days.

This patent is subject to a terminal disclaimer.

(21) Appl. No.: 18/182,589

(22) Filed: Mar. 13, 2023

(65) Prior Publication Data

US 2023/0211775 A1 Jul. 6, 2023

Related U.S. Application Data

(63) Continuation of application No. 17/039,217, filed on Sep. 30, 2020, now Pat. No. 11,603,092, which is a
(Continued)

(30) Foreign Application Priority Data

Mar. 30, 2018 (CN) .......................... 201810292560.7

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/18* (2013.01);
(Continued)

(58) Field of Classification Search
CPC ...... B60W 30/06; B60W 10/04; B60W 10/18; B60W 30/143; B60W 30/18072;
(Continued)

(56) References Cited

U.S. PATENT DOCUMENTS

| 2006/0149455 A1 | 7/2006 | Sawada |
| 2011/0015819 A1 | 1/2011 | Goto et al. |

(Continued)

FOREIGN PATENT DOCUMENTS

| CN | 101537833 A | 9/2009 |
| CN | 101607554 A | 12/2009 |

(Continued)

OTHER PUBLICATIONS

European Patent Office, 1st EP Examination Report for EP Appl. No. 18912575.0, generated on Jan. 2, 2024, 5 pages.
(Continued)

*Primary Examiner* — Jason Holloway
(74) *Attorney, Agent, or Firm* — Perkins Cole LLP

(57) ABSTRACT

The present disclosure provides a method and a device for vehicle parking control. The method includes following steps performed according to a predetermined time period until the vehicle stops at an end point: determining (101) a target position and a target speed when the vehicle arrives at the target position based on a current speed of the vehicle and a distance between a current position and the end point, the target position being on a road where the vehicle is located and in front of the vehicle; determining (102) a deceleration motion mode for the vehicle based on the current speed of the vehicle and the target speed; and performing (103) braking control for the vehicle in accordance with a vehicle braking strategy corresponding to the deceleration motion mode. The method can solve the prob-
(Continued)

lem in the related art associated with inaccurate vehicle parking control and uncomfortable experience.

20 Claims, 6 Drawing Sheets

Related U.S. Application Data continuation of application No. PCT/CN2018/105466, filed on Sep. 13, 2018.

(51) Int. Cl.
| | | |
|---|---|---|
| *B60W 10/18* | (2012.01) | |
| *B60W 30/14* | (2006.01) | |
| *B60W 30/18* | (2012.01) | |
| *B60W 40/105* | (2012.01) | |
| *B60W 50/02* | (2012.01) | |
| *B60W 60/00* | (2020.01) | |
| *G08G 1/14* | (2006.01) | |

(52) U.S. Cl.
CPC .... *B60W 30/143* (2013.01); *B60W 30/18072* (2013.01); *B60W 40/105* (2013.01); *B60W 50/0205* (2013.01); *B60W 60/00* (2020.02); *B60W 60/001* (2020.02); *G08G 1/143* (2013.01); *B60W 2520/10* (2013.01); *B60W 2520/30* (2013.01); *B60W 2540/10* (2013.01); *B60W 2554/80* (2020.02)

(58) Field of Classification Search
CPC ........... B60W 40/105; B60W 50/0205; B60W 60/001; B60W 2520/10; B60W 2520/30; B60W 2540/10; B60W 10/182; G08G 1/143; B60T 8/3275; B60T 2210/36; B60T 7/16; B60T 2201/10; B60T 7/22; B60T 8/72; B60T 8/321

See application file for complete search history.

(56) References Cited

U.S. PATENT DOCUMENTS

| | | |
|---|---|---|
| 2015/0375740 A1 | 12/2015 | Okamura et al. |
| 2017/0129485 A1 | 5/2017 | Seo |
| 2019/0031188 A1 | 1/2019 | Yamashita |
| 2021/0002405 A1 | 1/2021 | Ding et al. |

FOREIGN PATENT DOCUMENTS

| | | |
|---|---|---|
| CN | 101954870 A | 1/2011 |
| CN | 102167065 A | 8/2011 |
| CN | 102167066 A | 8/2011 |
| CN | 104169136 A | 11/2014 |
| CN | 104554279 A | 4/2015 |
| CN | 106043351 A | 10/2016 |
| CN | 107215334 A | 9/2017 |
| EP | 1908656 A1 | 4/2008 |
| EP | 2927079 A1 | 10/2015 |
| EP | 3069947 A1 | 9/2016 |
| JP | H0840231 A | 2/1996 |
| WO | 2017068694 A1 | 4/2017 |

OTHER PUBLICATIONS

Australian Patent Office, Examination Report No. 1 for AU Appl. No. 2018416898, mailed on Feb. 7, 2024, 3 pages.
Graniou, Marc. European Application No. 18912575.0, Extended European Search Report Mailed Nov. 11, 2021, pp. 1-11.
No Author. Chinese Application No. 201810292560.7, First Office Action Mailed May 5, 2019, p. 1-13.
No Author. International Application No. PCT/CN2018/105466, International Search Report and Written Opinion, Mailed Dec. 29, 2018.

METHOD AND DEVICE FOR VEHICLE PARKING CONTROL

This patent document is a continuation of U.S. patent application Ser. No. 17/039,217, filed on Sep. 30, 2020, which is a continuation of International Application No. PCT/CN2018/105466, filed Sep. 13, 2018, which claims priority to and benefits of Chinese Patent Application No. 201810292560.7, filed Mar. 30, 2018. The entire contents of the aforementioned patent applications are incorporated by reference as part of the disclosure of this document.

TECHNICAL FIELD

The present disclosure relates to autonomous driving technology, and more particularly, to a method and a device for vehicle parking control.

BACKGROUND

Autonomous vehicles are one of the development trends of future vehicles. In particular, for goods transportation by trucks, drivers driving trucks for long-distance transportation are prone to accidents due to fatigue, and at least two to three drivers are typically required for each truck, resulting in high costs. Autonomous driving of vehicles can not only emancipate the drivers and reduce labor costs, but also avoid accidents caused by drivers who are fatigued, drunk, influenced by drugs, or distracted, thereby reducing accident rates.

To achieve autonomous driving of vehicles, there are three necessary parts: perception, decision-making, and control. However, due to non-linear dynamic characteristics of trucks such as large inertia and hysteresis, how to accurately control a truck to stop at a specified position for loading/unloading goods at the specified position has become a technical problem to be solved by those skilled in the art.

Currently, a typical method for vehicle parking control may include: determining a target speed of the vehicle to move from a current position to a decided target position within a predetermined time length, calculating a speed error between a current speed of the vehicle and the target speed; performing feedback control on the speed error of the vehicle using a predefined Proportion Integration Differentiation (PID) algorithm to obtain a braking force for braking the vehicle, and controlling the vehicle to park by applying the braking force to the vehicle.

However, due to the non-linear dynamic characteristics, such as large inertia and hysteresis, of autonomous trucks, it is difficult to control a truck from a current speed to a target speed by using the conventional scheme for vehicle parking control especially when the truck moves at a low speed. In the conventional scheme, the PID algorithm is required for constantly adjusting the speed back and forth, which not only makes the movement of the truck unsmooth and leads to uncomfortable experience, but also makes it difficult to accurately control the truck to stop at a specified position due to accumulated errors.

SUMMARY

In view of the above problem, the present disclosure provides a method and a device for vehicle parking control, capable of solving the problem in the related art associated with inaccurate vehicle parking control and uncomfortable experience.

In a first aspect, a method for vehicle parking control is provided according to an embodiment of the present disclosure. The method includes following steps performed according to a predetermined time period until the vehicle stops at an end point: determining a target position and a target speed when the vehicle arrives at the target position based on a current speed of the vehicle and a distance between a current position and the end point, the target position being on a road where the vehicle is located and in front of the vehicle; determining a deceleration motion mode for the vehicle based on the current speed of the vehicle and the target speed; and performing braking control for the vehicle in accordance with a vehicle braking strategy corresponding to the deceleration motion mode.

In a second aspect, a device for vehicle parking control is provided according to an embodiment of the present disclosure. The device includes: a control unit configured to trigger a target position determining unit, a deceleration motion mode determining unit, and a braking control unit according to a predetermined time period until the vehicle stops at an end point; the target position determining unit configured to determine a target position and a target speed when the vehicle arrives at the target position based on a current speed of the vehicle and a distance between a current position and the end point, the target position being on a road where the vehicle is located and in front of the vehicle; the deceleration motion mode determining unit configured to determine a deceleration motion mode for the vehicle based on the current speed of the vehicle and the target speed; and the braking control unit configured to perform braking control for the vehicle in accordance with a vehicle braking strategy corresponding to the deceleration motion mode.

In a third aspect, a computer server is provided according to an embodiment of the present disclosure. The computer server includes a memory and one or more processors communicatively connected to the memory. The memory stores instructions executable by the one or more processors. The instructions, when executed by the one or more processors, cause the one or more processors to perform the above method for vehicle parking control.

In a fourth aspect, an autonomous vehicle is provided according to an embodiment of the present disclosure. The autonomous vehicle includes the above computer server.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

A method and a device for vehicle parking control according to the embodiments of the present disclosure can be provided on a computer server. The computer server can be a hardware device such as a Digital Signal Processor (DSP), a Field-Programmable Gate Array (FPGA) controller, a desktop computer, a mobile computer, a PAD, or a single-chip microcomputer. The computer server can be provided on all types of autonomous vehicles and advanced assisted driving vehicles, such as trucks, freight vehicles, buses, passenger cars, trailers, sprinklers, bicycles, etc., for controlling the autonomous vehicles or advanced assisted driving vehicles to park accurately.

Embodiment 1

Figure 1:
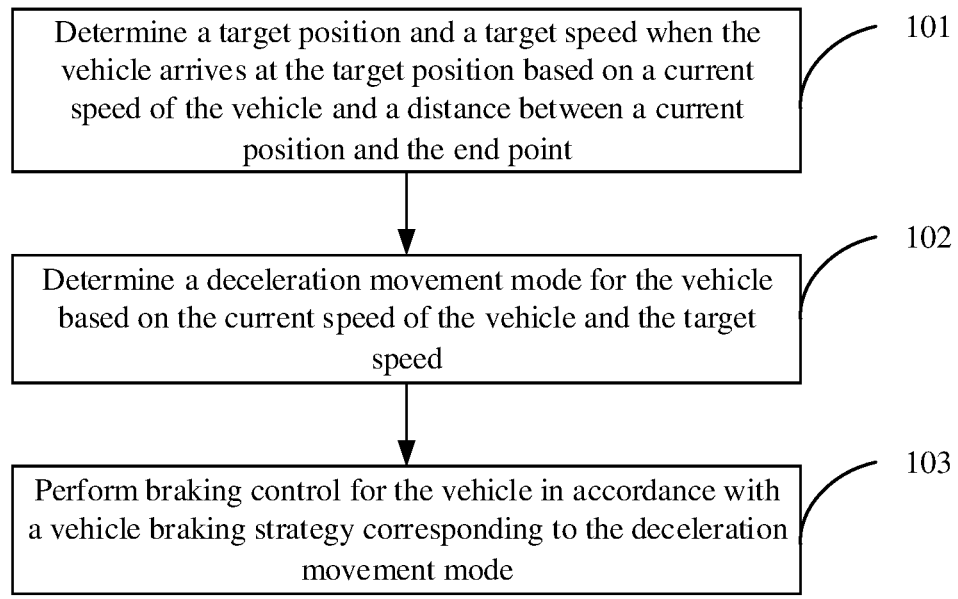
FIG. 1 is a first flowchart illustrating a method for vehicle parking control according to an embodiment of the present disclosure.

Referring to FIG. 1, which is a flowchart illustrating a method for vehicle parking control according to an embodiment of the present disclosure, the following steps 101~103 are performed according to a predetermined time period until the vehicle stops at an end point.

At step 101, a target position and a target speed when the vehicle arrives at the target position are determined based on a current speed of the vehicle and a distance between a current position and the end point. The target position is on a road where the vehicle is located and is in front of the vehicle.

In an embodiment of the present disclosure, the current speed and current position of the vehicle can be obtained by sensors installed on the vehicle. For example, the position of the vehicle can be obtained by a positioning sensor (e.g., Global Positioning System (GPS), Global Navigation Satellite System (GNSS), IMU, etc.), and the speed of the vehicle can be obtained by a speed sensor. The distance between the current position of the vehicle and the end point can be calculated based on coordinate information of the current position and coordinate information of the end point.

At step 102, a deceleration motion mode for the vehicle is determined based on the current speed of the vehicle and the target speed.

At step 103, braking control is performed for the vehicle in accordance with a vehicle braking strategy corresponding to the deceleration motion mode.

In an embodiment of the present disclosure, vehicle braking strategies corresponding to different types of deceleration motion modes can be preconfigured, and each vehicle braking strategy may be a segment of program codes that can be invoked. For example, after the type of the deceleration motion mode is determined in the step 102, in the step 103, a segment of program codes corresponding to the type can be invoked to perform braking control for the vehicle based on the determined type.

The above step 101 can be, but not limited to be, implemented in any of the following schemes (Scheme A1~Scheme A2).

Scheme A1: First, it is assumed that the vehicle moves from the current position to the end point with uniform deceleration and the speed of the vehicle when it arrives at the end point is 0, then physical equations related to the uniform deceleration movement in physics can be used to calculate acceleration for the vehicle to move from the current position to the end point with uniform deceleration based on the current speed of the vehicle and the distance between the current position and the end point. Second, with the current position of the vehicle as a start point, a road between the start point and the end point is divided equally into n parts (the value of n can be flexibly set depending on actual requirements and the present disclosure is not limited thereto), to obtain n position points and a distance between each of the n position points and the current position. Third, the speed when the vehicle arrives at each position point is calculated based on the current speed of the vehicle, the distance between each position point and the current position, and the acceleration. Finally, a target distance is determined based on the current speed of the vehicle, and a position point having a distance from the current position that matches the target distance is selected from the n position points as a target position point. The speed when the vehicle arrives at the selected position point is determined as a target speed when the vehicle arrives at the target position.

Figure 2:
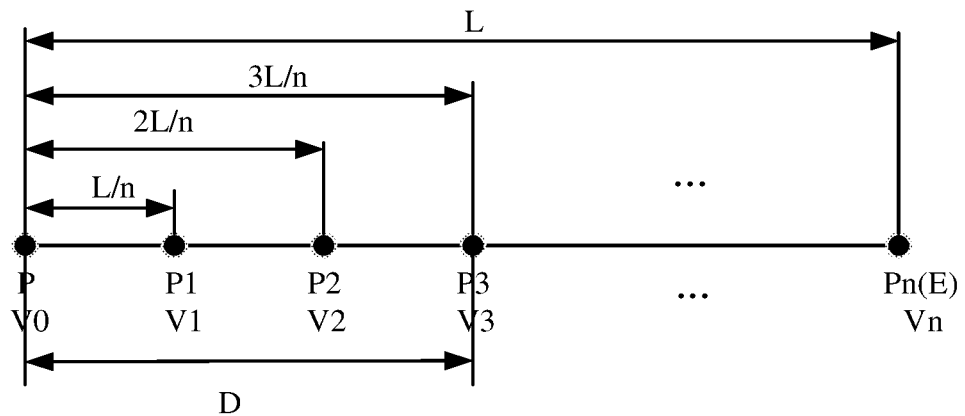
FIG. 2 is a schematic diagram showing how to determine a target position point according to an embodiment of the present disclosure.

As shown in FIG. 2, assuming that the current position of the vehicle is P, the current speed is V0, and the distance between P and the end point E is L, L is equally divided into n parts, and n position points are obtained as P1, P2, P3, . . . , Pn (Pn is the end point E), and the distances between P1, P2, P3, . . . , Pn and P are L/n, 2L/n, . . . , L. The speeds when the vehicle arrives at the n position points are sequentially V1, V2, V3, . . . , Vn. V0 is multiplied with a predetermined coefficient k (the value of k can be flexibly set depending on actual requirements, e.g., k can be set to 1 or 2, and the present disclosure is not limited thereto) to obtain a target distance D=V0*k. A position point having a distance from the current position P that matches the target distance D is selected from the n position points as the target position. For example, an absolute value of a difference between i) the distance between each position point and P and ii) D can be calculated, and a position point having the smallest absolute value can be selected as the target position point. For example, P3 can be selected as the target position.

Scheme A2: First, it is assumed that the vehicle moves from the current position to the end point with uniform deceleration and the speed of the vehicle when it arrives at the end point is 0, then physical equations related to the uniform deceleration movement in physics can be used to calculate acceleration for the vehicle to move from the current position to the end point with uniform deceleration based on the current speed of the vehicle and the distance between the current position and the end point. Second, a target distance is calculated based on the current speed of the vehicle. Then, with the current position as a start point, a position ahead along the road that has a length equal to the target distance is determined as a target position point. Finally, a target speed at the target position point is calculated based on the current speed of the vehicle, the acceleration and the target distance.

In an embodiment of the present disclosure, the above step 102 may include: determining whether the current speed is greater than a predetermined first speed threshold; and if so: determining the deceleration motion mode for the vehicle as a deceleration mode; or otherwise: determining whether the target speed is greater than 0, and if so, determining the deceleration motion mode for the vehicle as a low-speed coasting mode, or otherwise determining the deceleration motion mode for the vehicle as a parking mode. The deceleration mode means that the vehicle moving at a high speed in a normal state is to decelerate gently to a low speed. The low speed coasting mode means that the vehicle is to coast steadily at a relatively low speed. The parking mode means that the vehicle in a low-speed state needs to stop at the end point.

Figure 3:
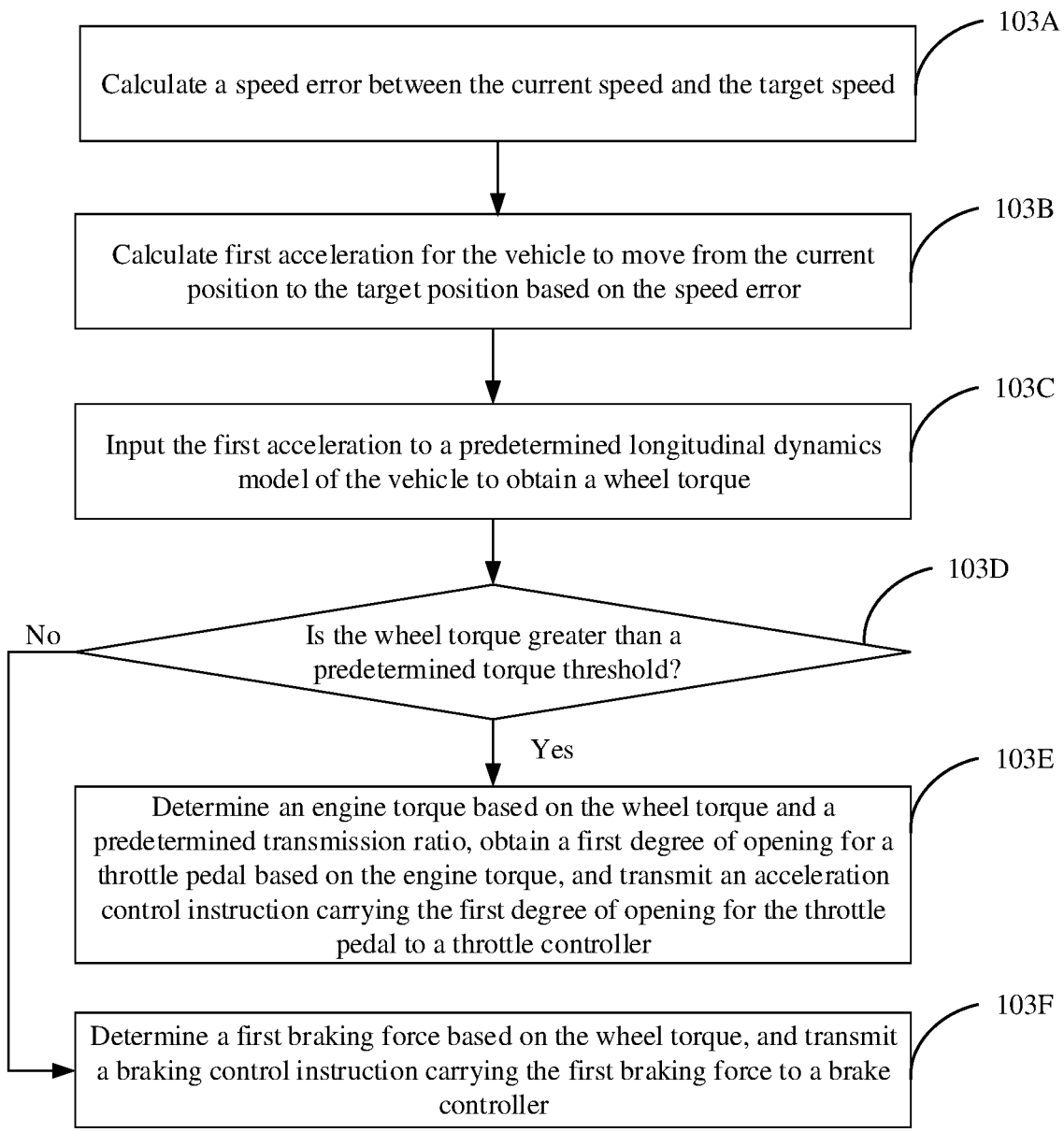
FIG. 3 is a flowchart illustrating a process of braking control for a vehicle in a deceleration mode according to an embodiment of the present disclosure.

In an embodiment of the present disclosure, when the deceleration motion mode is the deceleration mode, the above step 103 may include the following steps 103A~103F to perform braking control for the vehicle, as shown in FIG. 3.

At step 103A, a speed error between the current speed and the target speed can be calculated.

In the step 103A, a difference between the target speed and the current speed is determined as the speed error.

At step 103B, first acceleration for the vehicle to move from the current position to the target position is calculated based on the speed error.

In the step 103B, the first acceleration for the vehicle from the current position to the target position can be, but not limited to be, calculated based on the speed error in any of the following schemes (Scheme B1~Scheme B3):

Scheme B1: A predefined Proportion Integration Differentiation (PID) can be used to calculate the speed error, so as to obtain the first acceleration.

Scheme B2: A predefined Model Predictive Control (MPC) algorithm can be used to calculate a target distance and the speed error, so as to obtain the first acceleration.

Scheme B3: A predefined fuzzy control algorithm can be used to calculate the speed error, so as to obtain the first acceleration.

At step 103C, the first acceleration is input to a predetermined longitudinal dynamics model of the vehicle to obtain a wheel torque.

In an embodiment of the present disclosure, the principle of the longitudinal dynamics model of the vehicle can be as follows. First, a resistance f received by the vehicle is obtained. Second, the resistance f, the first acceleration a, and mass of the vehicle are input to Equation (1) below to calculate a driving force F. The driving force F and a rolling radius of a wheel are input to Equation (2) to calculate a wheel torque T of the wheel. Equation (1) and Equation (2) are as follows:

$$F = f + ma \quad (1)$$

where F is the driving force, f is the resistance received by the vehicle, m is the mass of the vehicle, and a is the first acceleration.

$$T = F/r \quad (2)$$

where F is the driving force, T is the wheel torque, and r is the rolling radius of the wheel.

In an embodiment of the present disclosure, the resistance f received by the vehicle may include a sum of any one or more of the following resistance: ground friction resistance, wind resistance, and slope resistance. Different types of roads, such as asphalt roads, cement roads, snow roads, icy roads, mud roads, etc., have different friction coefficients. A ground image captured by a camera sensor can be identified using an image identification algorithm to obtain a road type of the current road where the vehicle is located. The road type can be transmitted to the longitudinal dynamics model of the vehicle, such that the longitudinal dynamics model of the vehicle can select a corresponding friction coefficient based on the road type to calculate the ground friction resistance. The wind resistance is proportional to a windward area and a square of the speed of the vehicle. The slope information of the road can be measured by a vehicle-mounted sensor.

At step 103D, it is determined whether the wheel torque is greater than a predetermined torque threshold. If so, the method proceeds with step 103E, or otherwise the method proceeds with step 103F.

At step 103E, an engine torque is determined based on the wheel torque and a predetermined transmission ratio, a first degree of opening for a throttle pedal is obtained based on the engine torque, and an acceleration control instruction carrying the first degree of opening for the throttle pedal is transmitted to a throttle controller.

In the step 103E, the transmission ratio c is a ratio of the wheel torque to the engine torque. The transmission ratio is a known parameter. The wheel torque T and the transmission ratio c can be input to Equation (3) below to calculate the engine torque T':

$$T' = T/c \quad (3)$$

In an embodiment of the present disclosure, a table can be predefined (denoted as a first table hereinafter), and a first correspondence among engine speeds (an engine speed can be directly detected by a sensor, or a wheel speed can be calculated first based on the vehicle speed, and then an engine speed can be calculated based on the wheel speed and the transmission ratio), engine torques and degrees of opening for the throttle pedal can be provided in the first table. In the step 103E, the first table can be searched for the value of the first degree of opening for the throttle pedal corresponding to the engine torque T' calculated using Equation (3) and the current engine speed of the vehicle. If the value of the first degree of opening for the throttle pedal corresponding to T' and the current engine speed of the vehicle cannot be found in the first table, a linear interpolation algorithm can be used to interpolate the engine torques, engine speeds and degree of opening for the throttle pedal in the first table to obtain the first degree of opening for the throttle pedal corresponding to T' and the current engine speed of the vehicle.

At step 103F, a first braking force is determined based on the wheel torque, and a braking control instruction carrying the first braking force is transmitted to a brake controller.

In an embodiment of the present disclosure, the wheel torque can be input to Equation (4) below to calculate the first braking force:

$$P = T/(Sd) \quad (4)$$

where P is the first braking force; S is a cross-sectional area of a brake pipeline of the wheel; d is a distance between a brake caliper or brake drum's point of action and a center of the wheel.

In an embodiment of the present disclosure, when the vehicle is in the deceleration mode, in the braking strategy shown in FIG. 3, the throttle controller is controlled to reduce the value of the acceleration, and the vehicle is still in an accelerating state, such that the vehicle can slow down gently by gradually reducing the value of the acceleration while the vehicle is moving at a high speed, thereby avoiding emergency braking.

Figure 4:
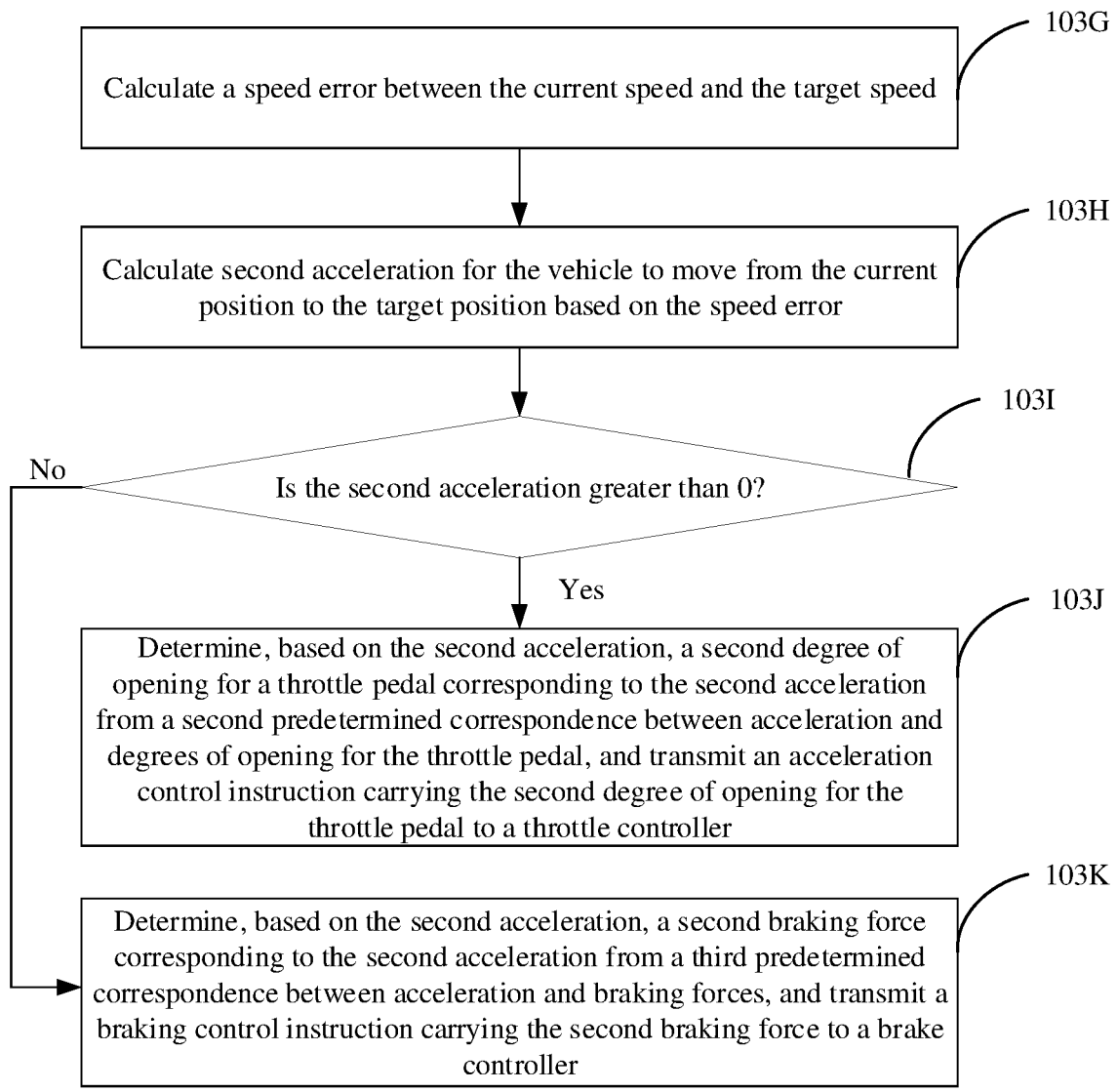
FIG. 4 is a flowchart illustrating a process of braking control for a vehicle in a low-speed coasting mode according to an embodiment of the present disclosure.

Preferably, when the deceleration motion mode is the low-speed coasting mode, the above step 103 may include the following steps 103G~103K to perform braking control for the vehicle, as shown in FIG. 4.

At step 103G, a speed error between the current speed and the target speed is calculated.

In the step 103G, a difference between the target speed and the current speed is determined as the speed error.

At step 103H, second acceleration for the vehicle to move from the current position to the target position is calculated based on the speed error.

In the step 103H, the second acceleration for the vehicle to from the current position to the target position can be, but not limited to be, calculated based on the speed error in any of the following schemes (Scheme C1~Scheme C2):

Scheme C1: A predefined Proportion Integration Differentiation (PID) can be used to calculate the speed error, so as to obtain the second acceleration.

Scheme C2: A predefined Model Predictive Control (MPC) algorithm can be used to calculate a target distance and the speed error, so as to obtain the second acceleration.

Scheme C3: A predefined fuzzy control algorithm can be used to calculate the speed error, so as to obtain the second acceleration.

At step 103I, it is determined whether the second acceleration is greater than 0. If so, the method proceeds with step 103J, or otherwise the method proceeds with step 103K.

At step 103J, a second degree of opening for a throttle pedal corresponding to the second acceleration is determined based on the second acceleration from a second predetermined correspondence between acceleration and degrees of opening for the throttle pedal, and an acceleration control instruction carrying the second degree of opening for the throttle pedal is transmitted to a throttle controller.

In an example, a table can be predefined (denoted as a second table hereinafter), and a second correspondence between acceleration and degrees of opening for the throttle pedal can be provided in the second table. In the step 103J, the second table can be searched for the second degree of opening for the throttle pedal corresponding to the second acceleration. If the acceleration having the same value as the second acceleration can be found in the second table, the degree of opening for the throttle pedal corresponding to the acceleration can be determined as the second degree of opening for the throttle pedal corresponding to the second acceleration. If the acceleration having the same value as the second acceleration cannot be found in the second table, the degree of opening for the throttle pedal corresponding to the acceleration closest to the value of the second acceleration in the second table can be determined as the second degree of opening for the throttle pedal corresponding to the second acceleration. Alternatively, if the second acceleration is between two adjacent acceleration values, the second degree of opening for the throttle pedal corresponding to the second acceleration can be obtained by interpolating the two adjacent acceleration values and their corresponding two degrees of opening for the throttle pedal.

At step 103K, a second braking force corresponding to the second acceleration is determining based on the second acceleration from a third predetermined correspondence between acceleration and braking forces, and a braking control instruction carrying the second braking force is transmitted to a brake controller.

In an example, a table can be predefined (denoted as a third table hereinafter), and a third correspondence between second acceleration and braking forces can be provided in the third table. In the step 103K, the second braking force corresponding to the second acceleration can be found in the third table. If the acceleration having the same value as the second acceleration can be found in the third table, the braking force corresponding to the acceleration can be determined as the second braking force corresponding to the second acceleration. If the acceleration having the same value as the second acceleration cannot be found in the third table, the braking force corresponding to the acceleration closest to the second acceleration in the third table can be determined as the second braking force corresponding to the second acceleration. Alternatively, if the second acceleration is between two adjacent acceleration values, the second braking force corresponding to the second acceleration can be obtained by interpolating the two adjacent acceleration values and their corresponding two braking forces.

In an embodiment of the present disclosure, when the vehicle is in the low-speed coasting mode, the braking strategy shown in FIG. 4 adopts different braking schemes according to the positive or negative acceleration value. If the acceleration is greater than 0, meaning that it is still in an accelerating state, then the throttle controller is controlled to reduce the value of acceleration and gradually reduce the speed. If the acceleration is smaller than 0, meaning that it is in a decelerating state, a braking force corresponding to the acceleration is obtained to brake the vehicle by an appropriate amount gradually. This strategy can be used to ensure that the vehicle can coast steadily in the low-speed coasting mode.

Figure 5:
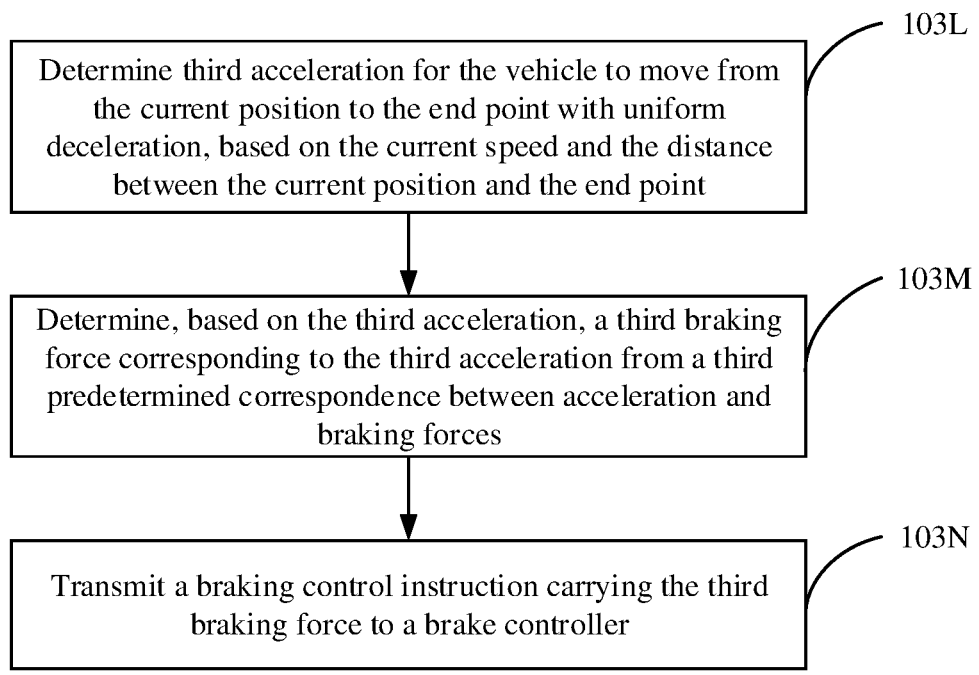
FIG. 5 is a flowchart illustrating a process of braking control for a vehicle in a parking mode according to an embodiment of the present disclosure.

Preferably, when the deceleration motion mode is the parking mode, the above step 103 may include the following steps 103L~103N, as shown in FIG. 5.

At step 103L, third acceleration for the vehicle to move from the current position to the end point with uniform deceleration is determined based on the current speed and the distance between the current position and the end point.

In the step 103L, it is first assumed that the vehicle moves from the current position to the end point with uniform deceleration and the speed of the vehicle when it arrives at the end point is 0, then physical equations related to the uniform deceleration movement in physics can be used to calculate the third acceleration for the vehicle to move from the current position to the end point with uniform deceleration based on the current speed of the vehicle and the distance between the current position and the end point.

At step 103M, a third braking force corresponding to the third acceleration is determined based on the third acceleration from a third predetermined correspondence between acceleration and braking forces.

In the embodiment of the present disclosure, in an example, a table can be predefined (denoted as a fourth table hereinafter), and a fourth correspondence between acceleration and braking forces can be provided in the fourth table. In the step 103M, the third braking force corresponding to the third acceleration can be found in the fourth table. If the acceleration having the same value as the third acceleration can be found in the fourth table, the braking force corresponding to the acceleration can be determined as the third braking force corresponding to the third acceleration. If the acceleration having the same value as the third acceleration cannot be found in the fourth table, the braking force corresponding to the acceleration closest to the third acceleration in the fourth table can be determined as the third braking force corresponding to the third acceleration. Alternatively, if the third acceleration is between two adjacent acceleration values, the third braking force corresponding to the third acceleration can be obtained by interpolating the two adjacent acceleration values and their corresponding two braking forces.

At step 103N, a braking control instruction carrying the third braking force is transmitted to a brake controller.

In an embodiment of the present disclosure, when the vehicle is in the parking mode, the braking strategy shown in FIG. 5 can determine acceleration based on the current speed of the vehicle and the distance between the current position and the end point, and obtain a braking force corresponding to the acceleration to control the vehicle in a low-speed state to stop accurately at the end.

In an embodiment of the present disclosure, for the same value of acceleration, the braking force corresponding to the acceleration in the third table is smaller than the braking force corresponding to the acceleration in the fourth table.

Figure 6:
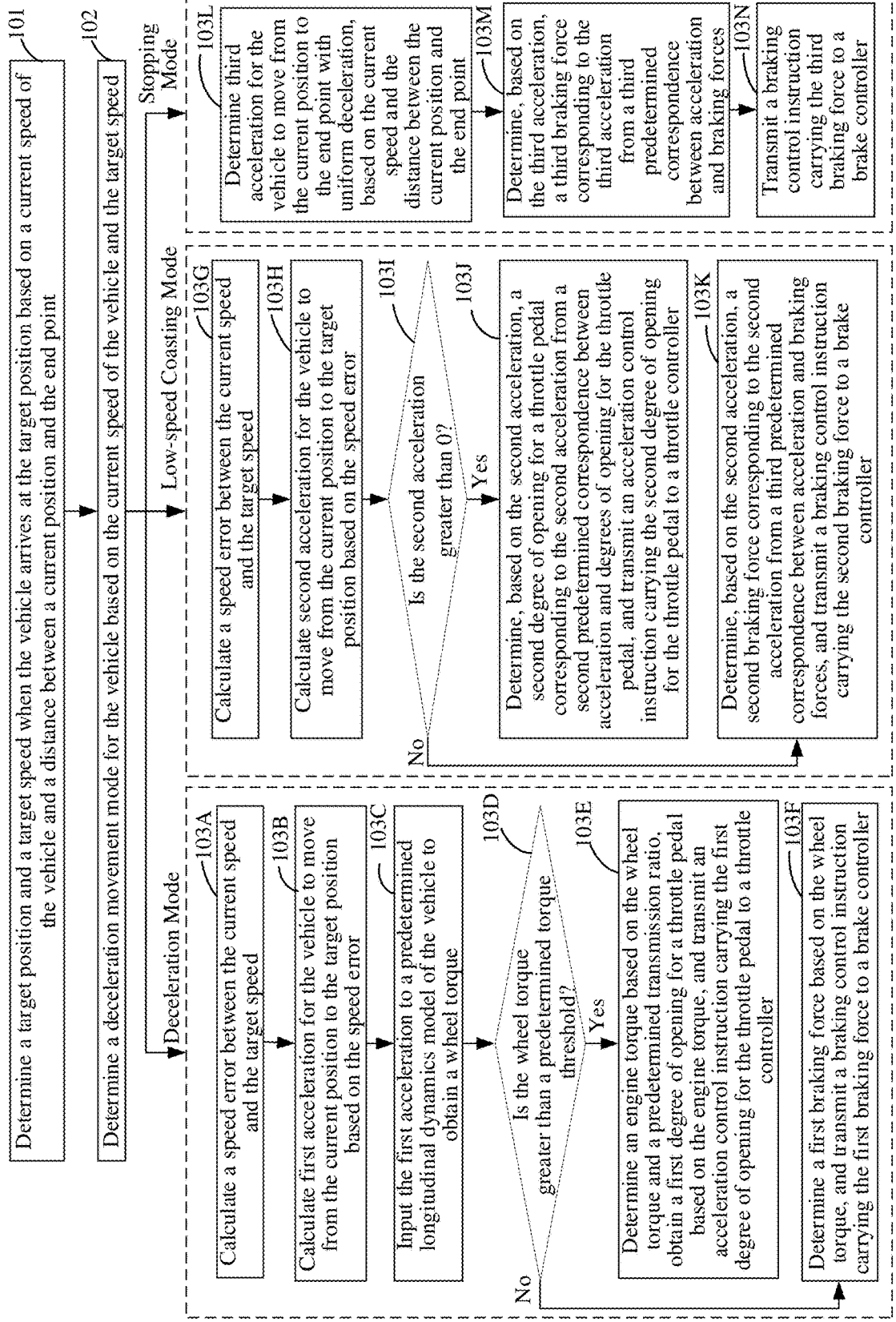
FIG. 6 is a second flowchart illustrating a method for vehicle parking control according to an embodiment of the present disclosure.

In Embodiment 1 of the present disclosure, the step 103 may include the above steps 103A~103N. As shown in FIG. 6, different vehicle braking strategies can be used to perform braking control for the vehicle in different deceleration motion modes. For example, the vehicle braking strategy can include the steps 103A~103F when the deceleration motion mode is determined as the deceleration mode, or the steps 103G~103K when the deceleration motion mode is the low-speed coasting mode, or the steps 103L~103N when the deceleration motion mode is the parking mode.

With the solutions according to the present disclosure, the vehicle can be controlled to switch from a high-speed state to three motion states: deceleration mode, low-speed coasting mode and parking mode, sequentially, and the corresponding braking strategies can be adopted to control the vehicle to decelerate steadily in the three motion states, respectively. In this way, the speed of the vehicle can be reduced steadily. When it is determined that the vehicle meets the parking mode (the current speed is low and the target speed is 0), the vehicle can be controlled to move with uniform deceleration based on the current speed of the vehicle and the distance to the end point, so as to control the vehicle in a low-speed state to stop accurately at the end point.

Embodiment 2

Figure 7:
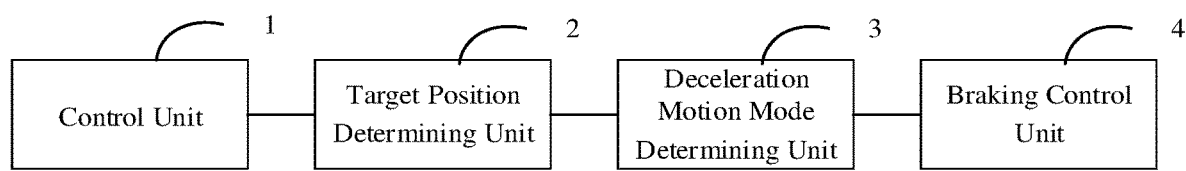
FIG. 7 is a schematic diagram showing a structure of a device for vehicle parking control according to an embodiment of the present disclosure.

Based on the same concept as the method for vehicle parking control according to Embodiment 1, Embodiment 2 of the present disclosure provides a device for vehicle parking control. The device can have a structure shown in FIG. 7, and can include the following units.

A control unit 1 is configured to trigger a target position determining unit 2, a deceleration motion mode determining unit 3, and a braking control unit 4 according to a predetermined time period until the vehicle stops at an end point.

The target position determining unit 2 is configured to determine a target position and a target speed when the vehicle arrives at the target position based on a current speed of the vehicle and a distance between a current position and the end point. The target position is on a road where the vehicle is located and is in front of the vehicle.

The deceleration motion mode determining unit 3 is configured to determine a deceleration motion mode for the vehicle based on the current speed of the vehicle and the target speed.

The braking control unit 4 is configured to perform braking control for the vehicle in accordance with a vehicle braking strategy corresponding to the deceleration motion mode.

The target position determining unit 2 can be, but not limited to be, implemented in any of Scheme A1~Scheme A2 according to the above Embodiment 1, and description thereof will be omitted here.

Preferably, in an example, the deceleration motion mode determining unit 3 can be configured to:
  determine whether the current speed is greater than a predetermined first speed threshold; and
  if so: determine the deceleration motion mode for the vehicle as a deceleration mode; or
  otherwise: determine whether the target speed is greater than 0, and if so, determine the deceleration motion mode for the vehicle as a low-speed coasting mode, or otherwise determine the deceleration motion mode for the vehicle as a parking mode.

Preferably, in an example, the braking control unit 4 can be configured to, when the deceleration motion mode determining unit 3 determines the deceleration motion mode as the deceleration mode, perform the following steps (corresponding to the steps 103A~103F in Embodiment 1 and details thereof will be omitted here):
  calculating a speed error between the current speed and the target speed;
  calculating first acceleration for the vehicle to move from the current position to the target position based on the speed error;
  inputting the first acceleration to a predetermined longitudinal dynamics model of the vehicle to obtain a wheel torque;
  determining whether the wheel torque is greater than a predetermined torque threshold; and
  if so, determining an engine torque based on the wheel torque and a predetermined transmission ratio, obtaining a first degree of opening for a throttle pedal based on the engine torque, and transmitting an acceleration control instruction carrying the first degree of opening for the throttle pedal to a throttle controller, or otherwise determining a first braking force based on the wheel torque, and transmitting a braking control instruction carrying the first braking force to a brake controller.

Preferably, in an example, the braking control unit 4 can be configured to, when the deceleration motion mode determining unit 3 determines the deceleration motion mode as the low-speed coasting mode, perform the following steps (corresponding to the steps 103G~103K in Embodiment 1 and details thereof will be omitted here):

calculating a speed error between the current speed and the target speed;

calculating second acceleration for the vehicle to move from the current position to the target position based on the speed error;

determining whether the second acceleration is greater than 0; and if so, determining, based on the second acceleration, a second degree of opening for a throttle pedal corresponding to the second acceleration from a first predetermined correspondence between acceleration and degrees of opening for the throttle pedal, and transmitting an acceleration control instruction carrying the second degree of opening for the throttle pedal to a throttle controller, or otherwise determining, based on the second acceleration, a second braking force corresponding to the second acceleration from a second predetermined correspondence between acceleration and braking forces, and transmitting a braking control instruction carrying the second braking force to a brake controller.

Preferably, in an example, the braking control unit 4 can be configured to, when the deceleration motion mode determining unit 3 determines the deceleration motion mode as the parking mode, perform the following steps (corresponding to the steps 103L~103N in Embodiment 1 and details thereof will be omitted here):

determining third acceleration for the vehicle to move from the current position to the end point with uniform deceleration, based on the current speed and the distance between the current position and the end point;

determining, based on the third acceleration, a third braking force corresponding to the third acceleration from a third predetermined correspondence between acceleration and braking forces; and transmitting a braking control instruction carrying the third braking force to a brake controller.

In an embodiment of the present disclosure, after the braking control unit 4 uses the vehicle braking strategy corresponding to the parking mode to perform braking control for the vehicle, the control unit 1 determines that the vehicle stops at the end point and no longer triggers the above target position determining unit 2, the deceleration motion mode determining unit 3, and the braking control unit 4.

In Embodiment 2 of the present disclosure, the braking control unit 4 can perform the steps that need to be performed in the above different deceleration motion modes.

The device for vehicle parking control according to Embodiment 2 of the present disclosure may be provided in a computer server.

Embodiment 3

In an embodiment of the present disclosure, the methods for vehicle parking control according to the above Embodiment 1 can be implemented by a computer server controlled by a computer program. Therefore, correspondingly, an embodiment of the present disclosure can also provide a computer server. The computer server may include a memory and one or more processors communicatively connected to the memory. The memory may store instructions executable by the one or more processors, and the instructions, when executed by the one or more processors, cause the one or more processors to implement the method described in the above Embodiment 1.

Additionally, in an embodiment of the present disclosure, a non-volatile computer storage medium is also provided. The computer storage medium stores computer-executable instructions for performing the method described in the above Embodiment 1.

Alternatively, in an embodiment of the present disclosure, a computer program product is also provided. The computer program product includes computer-executable instructions for performing the method described in the above Embodiment 1.

Embodiment 4

In an embodiment of the present disclosure, an autonomous vehicle is also provided. The autonomous vehicle includes the above computer server.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program.

The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for vehicle parking control, comprising following steps performed according to a predetermined time period until the vehicle stops at an end point:
    determining a target position and a target speed at which the vehicle arrives at the target position based on a current speed of the vehicle and a distance between a current position and the end point, the target position being on a road where the vehicle is located and in front of the vehicle;
    determining a deceleration motion mode for the vehicle based on the current speed of the vehicle and the target speed; and
    performing braking control for the vehicle in accordance with a vehicle braking strategy corresponding to the deceleration motion mode,
    wherein said performing braking control for the vehicle in accordance with the vehicle braking strategy corresponding to the deceleration motion mode comprises performing a first operation in response to determining the deceleration motion mode as a deceleration mode or performing a second operation in response to determining the deceleration motion mode as a low-speed coasting mode,
    wherein performing the first operation comprises:
        calculating first acceleration for the vehicle to move from the current position to the target position based on a speed error between the current speed and the target speed;
        inputting the first acceleration to a predetermined longitudinal dynamics model of the vehicle to obtain a wheel torque; and
        in response to the wheel torque being greater than a predetermined torque threshold, determining an engine torque based on the wheel torque and a predetermined transmission ratio, and transmitting an acceleration control instruction carrying a first degree of opening for a throttle pedal to a throttle controller, wherein the first degree of opening for the throttle pedal is determined based on the engine torque, and
    wherein performing the second operation comprises:
        calculating second acceleration for the vehicle to move from the current position to the target position based on a speed error between the current speed and the target speed; and
        in response to the second acceleration being greater than 0, determining a second degree of opening for a throttle pedal corresponding to the second acceleration from a first predetermined correspondence between acceleration and degrees of opening for the throttle pedal, and transmitting an acceleration control instruction carrying the second degree of opening for the throttle pedal to a throttle controller.

2. The method of claim 1, further comprising:
    determining the deceleration motion mode for the vehicle as the low-speed coasting mode in response to the current speed being not greater than the predetermined first speed threshold and the target speed being greater than 0.

3. The method of claim 1, further comprising: determining the deceleration motion mode for the vehicle as a parking mode in response to the current speed being not greater than the predetermined first speed threshold and the target speed being not greater than 0.

4. The method of claim 1, wherein performing the first operation further comprises:
    in response to the wheel torque being not greater than the predetermined torque threshold, transmitting a braking control instruction carrying a first braking force to a brake controller, wherein the first braking force is determined based on the wheel torque.

5. The method of claim 1, wherein performing the second operation further comprises:
    in response to the second acceleration being not greater than 0, determining a second braking force corresponding to the second acceleration from a second predetermined correspondence between acceleration and braking forces, and transmitting a braking control instruction carrying the second braking force to a brake controller.

6. The method of claim 1, wherein said performing braking control for the vehicle in accordance with the vehicle braking strategy corresponding to the deceleration motion mode further comprises, when determining the deceleration motion mode as a parking mode:
    determining third acceleration for the vehicle to move from the current position to the end point with uniform deceleration, based on the current speed and the distance between the current position and the end point;
    determining a third braking force corresponding to the third acceleration from a third predetermined correspondence between acceleration and braking forces; and
    transmitting a braking control instruction carrying the third braking force to a brake controller.

7. The method of claim 1, further comprising:
  determining the deceleration motion mode for the vehicle as the deceleration mode in response to the current speed being greater than a predetermined first speed threshold.

8. An autonomous vehicle, comprising a computer server, wherein the computer server comprises a memory and one or more processors communicatively connected to the memory, the memory storing instructions executable by the one or more processors, and the instructions, when executed by the one or more processors, causing the one or more processors to perform a method for vehicle parking control, wherein the method comprises following steps performed according to a predetermined time period until the vehicle stops at an end point:
  determining a target position, and a target speed on which the vehicle arrives at the target position, based on a current speed of the vehicle and a distance between a current position and the end point, the target position being on a road where the vehicle is located and in front of the vehicle;
  determining a deceleration motion mode for the vehicle based on the current speed of the vehicle and the target speed; and
  performing braking control for the vehicle in accordance with a vehicle braking strategy corresponding to the deceleration motion mode,
  wherein said performing braking control for the vehicle in accordance with the vehicle braking strategy corresponding to the deceleration motion mode comprises performing a first operation in response to determining the deceleration motion mode as a deceleration mode or performing a second operation in response to determining the deceleration motion mode as a low-speed coasting mode,
  wherein performing the first operation comprises:
    calculating first acceleration for the vehicle to move from the current position to the target position based on a speed error between the current speed and the target speed;
    inputting the first acceleration to a predetermined longitudinal dynamics model of the vehicle to obtain a wheel torque; and
    in response to the wheel torque being greater than a predetermined torque threshold, determining an engine torque based on the wheel torque and a predetermined transmission ratio, and transmitting an acceleration control instruction carrying a first degree of opening for a throttle pedal to a throttle controller, wherein the first degree of opening for the throttle pedal is determined based on the engine torque, and
  wherein performing the second operation comprises:
    calculating second acceleration for the vehicle to move from the current position to the target position based on a speed error between the current speed and the target speed; and
    in response to the second acceleration being greater than 0, determining a second degree of opening for a throttle pedal corresponding to the second acceleration from a first predetermined correspondence between acceleration and degrees of opening for the throttle pedal, and transmitting an acceleration control instruction carrying the second degree of opening for the throttle pedal to a throttle controller.

9. The autonomous vehicle of claim 8, wherein said performing braking control for the vehicle in accordance with the vehicle braking strategy corresponding to the deceleration motion mode comprises:
  determining the deceleration motion mode for the vehicle as the low-speed coasting mode in response to the current speed being not greater than the predetermined first speed threshold and the target speed being greater than 0.

10. The autonomous vehicle of claim 8, wherein said performing braking control for the vehicle in accordance with the vehicle braking strategy corresponding to the deceleration motion mode comprises:
  determining the deceleration motion mode for the vehicle as a parking mode in response to the current speed being not greater than the predetermined first speed threshold and the target speed being not greater than 0.

11. The autonomous vehicle of claim 8, wherein performing the first operation further comprises:
  in response to the wheel torque being not greater than the predetermined torque threshold, determining a first braking force based on the wheel torque, and transmitting a braking control instruction carrying the first braking force to a brake controller.

12. The autonomous vehicle of claim 9, wherein performing the second operation further comprises:
  in response to the second acceleration being not greater than 0, determining, based on the second acceleration, a second braking force corresponding to the second acceleration from a second predetermined correspondence between acceleration and braking forces, and transmitting a braking control instruction carrying the second braking force to a brake controller.

13. The autonomous vehicle of claim 8, wherein the method further comprises:
  determining the deceleration motion mode for the vehicle as the deceleration mode in response to the current speed being greater than a predetermined first speed threshold.

14. A non-transitory machine-useable storage medium embodying instructions which, when executed by a machine, cause the machine to perform following steps according to a predetermined time period until a vehicle stops at an end point:
  determining a target position and a target speed at which the vehicle arrives at the target position based on a current speed of the vehicle and a distance between a current position and the end point, the target position being on a road where the vehicle is located and in front of the vehicle;
  determining a deceleration motion mode for the vehicle based on the current speed of the vehicle and the target speed; and
  performing braking control for the vehicle in accordance with a vehicle braking strategy corresponding to the deceleration motion mode,
  wherein said performing braking control for the vehicle in accordance with the vehicle braking strategy corresponding to the deceleration motion mode comprises performing a first operation in response to determining the deceleration motion mode as a deceleration mode or performing a second operation in response to determining the deceleration motion mode as a low-speed coasting mode,
  wherein performing the first operation comprises:
    calculating first acceleration for the vehicle to move from the current position to the target position based on a speed error between the current speed and the target speed;

inputting the first acceleration to a predetermined longitudinal dynamics model of the vehicle to obtain a wheel torque; and in response to the wheel torque being greater than a predetermined torque threshold, determining an engine torque based on the wheel torque and a predetermined transmission ratio, and transmitting an acceleration control instruction carrying a first degree of opening for a throttle pedal to a throttle controller, wherein the first degree of opening for the throttle pedal is determined based on the engine torque, and wherein performing the second operation comprises:

calculating second acceleration for the vehicle to move from the current position to the target position based on a speed error between the current speed and the target speed; and in response to the second acceleration being greater than 0, determining a second degree of opening for a throttle pedal corresponding to the second acceleration from a first predetermined correspondence between acceleration and degrees of opening for the throttle pedal, and transmitting an acceleration control instruction carrying the second degree of opening for the throttle pedal to a throttle controller.

15. The non-transitory machine-useable storage medium of claim 14, wherein the instructions, when executed by the machine, cause the machine to perform further:

determining the deceleration motion mode for the vehicle as the low-speed coasting mode in response to the current speed being not greater than the predetermined first speed threshold and the target speed being greater than 0.

16. The non-transitory machine-useable storage medium of claim 14, wherein the instructions, when executed by the machine, cause the machine to perform further:

determining the deceleration motion mode for the vehicle as a parking mode in response to the current speed being not greater than the predetermined first speed threshold and the target speed being not greater than 0.

17. The non-transitory machine-useable storage medium of claim 14, wherein performing the first operation further comprises:

in response to the wheel torque being not greater than the predetermined torque threshold, transmitting a braking control instruction carrying a first braking force to a brake controller, wherein the first braking force is determined based on the wheel torque.

18. The non-transitory machine-useable storage medium of claim 14, wherein performing the second operation further comprises:

in response to the second acceleration being not greater than 0, determining a second braking force corresponding to the second acceleration from a second predetermined correspondence between acceleration and braking forces, and transmitting a braking control instruction carrying the second braking force to a brake controller.

19. The non-transitory machine-useable storage medium of claim 14, wherein said performing braking control for the vehicle in accordance with the vehicle braking strategy corresponding to the deceleration motion mode further comprises, when determining the deceleration motion mode as a parking mode:

determining third acceleration for the vehicle to move from the current position to the end point with uniform deceleration, based on the current speed and the distance between the current position and the end point;

determining a third braking force corresponding to the third acceleration from a third predetermined correspondence between acceleration and braking forces; and transmitting a braking control instruction carrying the third braking force to a brake controller.

20. The non-transitory machine-useable storage medium of claim 14, wherein the instructions, when executed by the machine, cause the machine to perform further:

determining the deceleration motion mode for the vehicle as the deceleration mode in response to the current speed being greater than a predetermined first speed threshold.

\* \* \* \* \*